United States Patent Office 2,985,779
Patented May 23, 1961

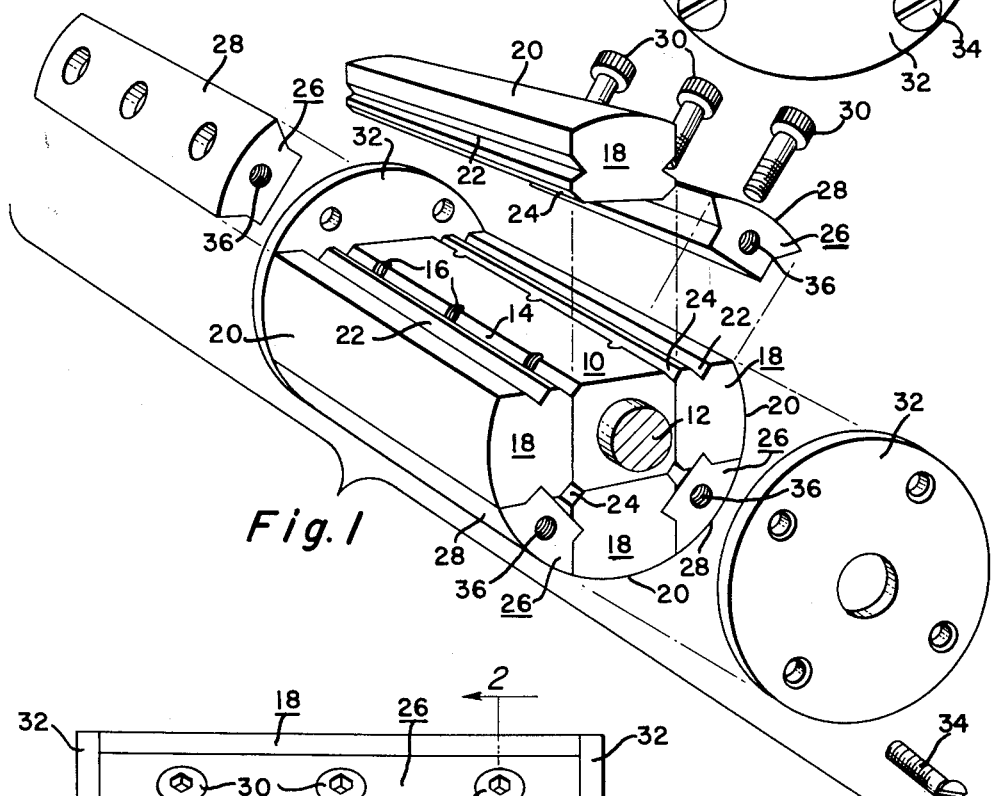
Fig. 2
Fig. 1
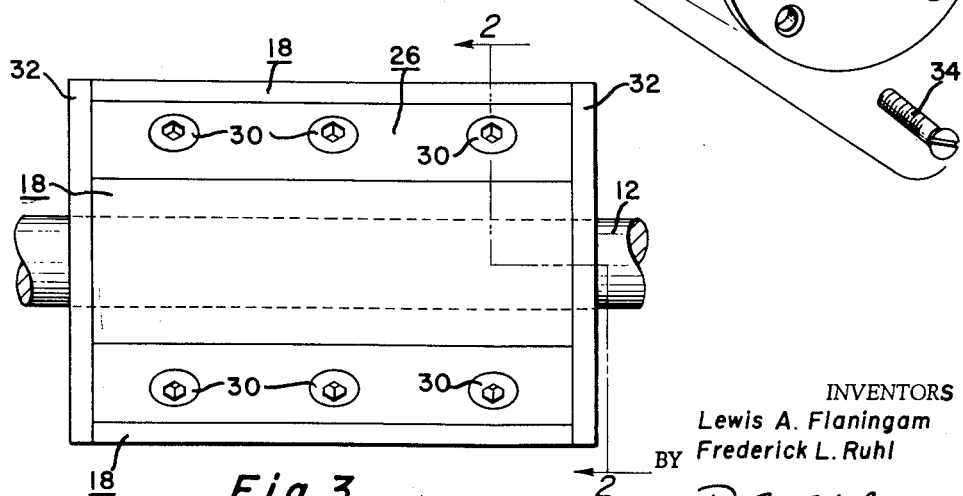
Fig. 3
INVENTORS
Lewis A. Flaningam
Frederick L. Ruhl
BY
D.C. Staley
Their Attorney

2,985,779

PERMANENT MAGNET ROTOR CONSTRUCTION

Lewis A. Flaningam, Dayton, and Frederick L. Ruhl, Covington, Ohio, assignors to General Motors Corporation, Detroit, Mich., a corporation of Delaware Filed Sept. 9, 1957, Ser. No. 682,888

2 Claims. (Cl. 310—156)

This invention pertains to dynamo electric machines, and particularly to permanent magnet rotors.

Heretofore, it has been customary to manufacture permanent rotors for generators or motors by attaching a cylindrical permanent magnet having an axial through bore to a shaft by means of matrix metal which is cast in place. However, this type of motor construction cannot be used when the rotor is subjected to high ambient temperatures due to the low melting temperature of the matrix metal. The present invention relates to an improved rotor construction designed for high ambient temperature use. Accordingly, among our objects are the provision of improved high temperature permanent magnet rotor construction; the further provision of a rotor including a plurality of permanent bar type magnets; and the still further provision of a rotor of the aforesaid type including means for securing the bar magnets to a core assembly with electrically conductive nonmagnetic bars.

The aforementioned and other objects are accomplished in the present invention by securing the bar magnets in place by means of wedges. Specifically, the rotor construction comprises a magnetic steel core which is suitably attached to a shaft. The core is substantially square in cross section except for chamfered corners. Each chamfered corner has a plurality of threaded holes therein. Each flat side of the corner supports a bar type Alnico magnet having its opposite side of arcuate configuration. In addition, each bar magnet has V-shaped grooves extending longitudinally thereof on opposite sides. The four bar magnets are held in place by four nonmagnetic electrically conductive metal wedge members, having one side of arcuate configuration so as to form a cylindrical rotor periphery. The wedge members are snugly received by the V-shaped grooves in the bar magnets, and are attached to the core by a plurality of Allen head screws. In order to prevent axial movement of the bar magnet relative to the core and to complete the damper circuit each wedge member has an axially extending tapped hole at each end thereof, and each end of the rotor receives an annulus of nonmagnetic electrically conductive metal which is secured to the ends of the wedge members by screws.

The improved rotoor construction is well adapted for use in high ambient temperatures, and is particularly designed for use in ram air driven alternators used to supply emergency power for aircraft. Thus, the rotor of this invention can be used in an air driven power unit of the type disclosed in copending applications Serial No. 420,277 Hook et al., now Patent No. 2,857,006, and Serial No. 420,278 Blackburn et al. filed April 1, 1954, now Patent No. 2,876,847, and assigned to the assignee of this invention.

Further objects and advantages of the present invention will be apparent from the following description, reference being had to the accompanying drawing, wherein a preferred embodiment of the present invention is clearly shown.

In the drawing:

Figure 1 is an exploded view of a rotor constructed according to this invention.

Figure 2 is a view, partly in section and partly in elevation, taken along line 2—2 of Figure 3.

Figure 3 is a side view in elevation of a rotor constructed according to this invention.

With particular reference to Figure 1, a permanent magnet rotor is shown including a central core 10 of magnetic steel. The core 10 has an axial through bore through which a shaft 12 extends, the shaft being drivingly connected to the core 10 by any suitable means, not shown. The core 10 is substantially square in cross section except for chamfered corners 14. Each chamfered corner 14 has three tapped holes 16 therein.

The rotor also includes four Alnico bar type permanent magnets 18 having flat inner surfaces adapted to rest on the core 10 and outer surfaces 20 of arcuate configuration. In addition, each of the bar magnets 18 has a longitudinally extending V-shaped groove 22 on each side thereof as well as a chamfered corner 24. The magnets 18 are circumferentially spaced about the core 10, and are retained in position by wedge members 26 composed of nonmagnetic electrically conductive metal. Each wedge member 26 has an outer surface 28 of arcuate configuration, and the bottom thereof is adapted to be received in the grooves 22 of the bar magnet. Each wedge member 26 is attached to the core 10 by three Allen head screws 30, the heads of which are received, or disposed, beneath the outer periphery of the rotor, as shown in Figure 2.

In order to secure the wedge members against movement due to rotation of the rotor at high speeds and to provide a complete damper circuit, each end of the rotor receives an annulus 32 which is secured to the wedge members 26 by screws 34. The screws 34 are received in threaded holes 36 in the ends of the wedge members. The screws 34 are counter sunk, as indicated in Figure 2.

The improved permanent magnet rotor assembly is well adapted for use in high ambient temperatures since the bar magnets are attached to the core mechanically. Moreover, by virtue of the rotor construction, assembly thereof is exceedingly simple.

While the embodiment of the invention as herein disclosed constitutes a preferred form, it is to be understood that other forms might be adopted.

What is claimed is as follows:

1. A rotor for a dynamo electric machine, including, a core of magnetic material, a plurality of circumferentially spaced permanent magnets, a plurality of wedge members of nonmagnetic electrically conductive material disposed between said magnets, and means removably securing said wedges to said core so as to maintain said permanent magnets in assembled relation with said core and complete a damper circuit.

2. A rotor for a dynamo electric machine, including, a core, a plurality of circumferentially spaced permanent magnets, a plurality of wedge members disposed between said magnets, means removably securing said wedge members to said core for maintaining the permanent magnets in assembled relation therewith, and an annulus removably attached to said wedge members at each end of said rotor for completing a damper circuit.

References Cited in the file of this patent

UNITED STATES PATENTS

| | | |
|---|---|---|
| 939,910 | Hassler | Nov. 9, 1909 |
| 2,692,345 | Wahlberg | Oct. 19, 1954 |
| 2,739,253 | Plumb | Mar. 20, 1956 |

FOREIGN PATENTS

| | | |
|---|---|---|
| 104,872 | Switzerland | June 2, 1924 |
| 517,614 | Great Britain | Feb. 5, 1940 |
| 668,436 | Germany | Dec. 3, 1938 |